Dec. 27, 1938.  W. G. ROBY  2,141,878
FASTENER MEMBER AND INSTALLATION OF THE SAME
Filed Jan. 19, 1937
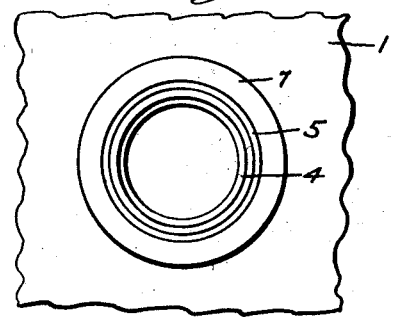
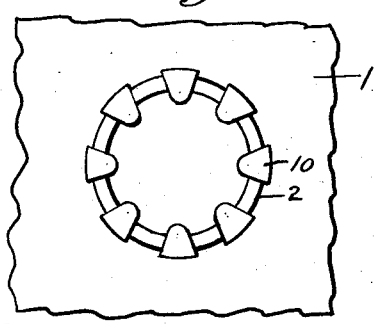
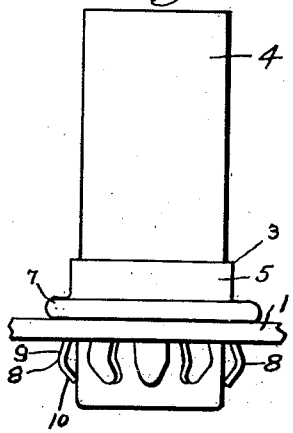
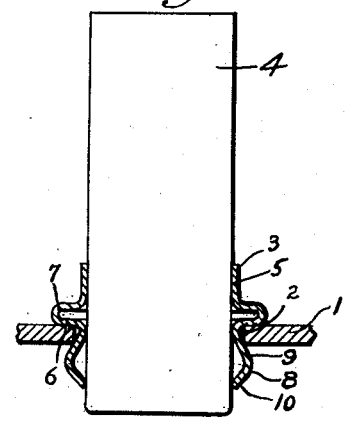
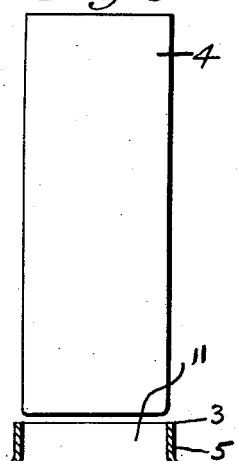
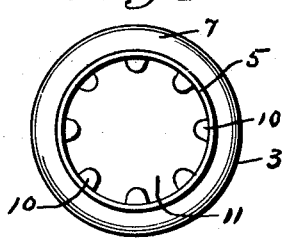
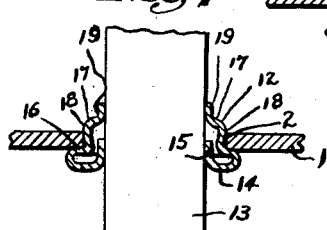
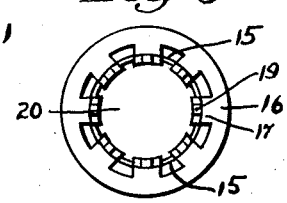
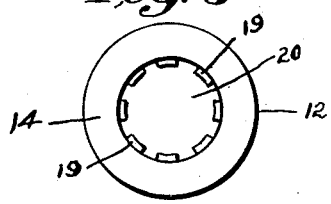
Inventor:
William G. Roby.
by Walter S. Jones
Att'y.

Patented Dec. 27, 1938

2,141,878

UNITED STATES PATENT OFFICE 2,141,878

FASTENER MEMBER AND INSTALLATION OF THE SAME

William G. Roby, Park Ridge, Ill., assignor to Cinch Manufacturing Corporation, Chicago, Ill., a corporation of Illinois Application January 19, 1937, Serial No. 121,302

4 Claims. (Cl. 248—56)

My invention relates to improvements in fastener members and installations of the same.

An object of my invention is to provide a fastener member, used in combination with an apertured support and an article of manufacture to be secured to the support, which is constructed in a way to be firmly secured to the support when the article of manufacture is properly assembled with the installation, and at the same time have means gripping the article so as to either prevent ready removal of the article from assembled position or impede relative easy movement of the article.

Another object of my invention is the provision of a fastener member capable of being rigidly secured to a support and having an axial passage providing a bearing means for an article of manufacture extending through the support.

Other features of my invention are apparent from inspection of the drawing and specification herein set forth.

Referring to the drawing, in which I have illustrated preferred embodiments of my invention:—

Figure 1 is a top plan view of my preferred form of fastener installation;

Fig. 2 is a bottom plan view of the installation shown in Fig. 1 before the condenser is put in place;

Fig. 3 is an elevational view of the installation shown in Fig. 1;

Fig. 4 is a section of the installation shown in Figs. 2 and 3 with the article of manufacture shown in elevation;

Fig. 5 is a section similar to that of Fig. 4 showing an article of manufacture about to be moved into engagement with my fastener member;

Fig. 6 is a top plan view of my fastener member per se;

Fig. 7 is a section through an installation showing a modified form of fastener member, an article of manufacture being shown in elevation;

Fig. 8 is a top plan view of my modified fastener shown in Fig. 7; and

Fig. 9 is a bottom plan view of the fastener shown in Figs. 7 and 8.

Referring to my first form of invention, I have shown in Figs. 1, 3 and 4 of the drawing a preferred fastener installation comprising a support 1 having a circular aperture 2, a fastener member 3 secured to the support through means engaging the material of the support adjacent the aperture 2 and an article of manufacture 4 extending through the aperture 2 of the support and secured in position relative to the support by means of the fastener member.

The article 4 may be a fixed cartridge condenser of the type commonly used in a radio set having a tubular-shaped outer covering of cardboard or other relatively stiff material.

Referring in detail to my first form of fastener member as illustrated in Figs. 3–6, I have provided an eyelet-like member having a tubular shank 5 open at both ends. The walls at one end of the shank 5 flare outwardly and then extend inwardly as at 6 forming a support-engaging means in the form of a base flange 7 which is of greater diameter than the aperture 2 of the support 1. Resilient arm portions 8 project from the inwardly-extending portions 6 of the flange 7 and are arranged, in my preferred form, in an annular series around the inner edge of the portions 6 (Figs. 4 and 5). The arms 8 are provided with shoulders 9 and free end portions 10, which last-mentioned portions extend toward and intersect the axial passage 11 through the tubular shank 5 (Fig. 6) for a reason to be described. In assembling the parts of my installation together, I first snap the attaching member 3 into the aperture 2 so that the flange 7 lies adjacent a surface of the support 1 and the shoulders 9 engage the material of the support 1 adjacent the aperture 2 to hold the attaching member in place (Fig. 5). A free end of the article 4, which has a diameter greater than the diameter of an imaginary circle defined by the outermost ends of the arms 8, is moved through the axial passage of the shank 5 into engagement with the end portions 10, and, as pressure is exerted upon the article, the arms 8 are forced outwardly so as to lock the shoulders 9 adjacent the material of the support 1, as shown in Fig. 4. At the same time, the outermost ends of the portions 10 frictionally engage the outer covering of the article 4 to prevent ready movement of the article relative to the fastener member (Fig. 4). It is apparent that the degree of fixedness of an article relative to the fastener member may be regulated by making obvious changes in the construction of the attaching arms of the fastener member, such, for example, as forming the end portions with a blunt or sharp point, as desired, or varying the angle of the end portions relative to the article.

The modified form of my invention as illustrated in Figs. 7 and 8 comprises a support 1 having an aperture 2, a fastener member 12 snapped into the aperture, and a shaft 13 extending through the aperture 2 and supported by a bearing provided by the fastener member.

The fastener 12, in my preferred form, has a support-engaging means, such as the base 14, at one end and a tubular shank 15 (Fig. 7), formed from material within the periphery of the base, extending from the base in substantially perpendicular relation thereto. Folded-under portions 16, integral with the peripheral edges of the base are disposed beneath the base and an annular series of yieldable arms 17 extends from the free edges of the folded-under portions in the same direction taken by the shank 15 (Fig. 7). Each of the arms 17 has a shoulder portion 18 for engagement with the material of the support adjacent the aperture 2 and a free end portion 19 disposed in line with the bore 20 of the shank 15 before assembly of the shaft with the fastener member, as most clearly shown in Fig. 8. The free end portions 19 in my modified form are formed in such a way that their inner surfaces lie in straight lines substantially parallel to the axis of the shaft 13 when the shaft is projected through the fastener. As a result of this construction, the portions 19 combine with the walls of the shank 15 to provide a bearing permitting either longitudinal movement of the shaft relative to the axis of the fastener or rotation of the shaft.

In assembling the parts of my modified installation, the fastener member 12 is first snapped into the aperture and then the shaft 13 is passed through the axial passage of the fastener defined by the bore 20 of the shank 15 and the circle formed by inner surfaces of the end portions 19 of the arms 17. As a result of the fact that the diameter of the shaft 13 is greater than the diameter of the imaginary circle defined by the inner surfaces of the ends 19 before the shaft is assembled with the fastener, the shaft 13 forces the arms 17 outwardly when disposed within the axial passage of the fastener so as to lock the shoulders 18 against the material of the support 1 adjacent the aperture 2, as most clearly shown in Fig. 7.

My fastener installations have a variety of uses and for that reason I do not wish to be limited to the specific forms of the parts of my installations as illustrated and described. Also, I do not wish to be limited by the particular construction of my preferred forms of attaching members because it it apparent to those skilled in the art that my fastener members could be made to work by relying on yieldable arms for attaching the fastener to the support which do not have the aforesaid snap fastener action, but which are expanded to grip the walls of the support surrounding the aperture solely by engagement of the shaft or tubular member with the free end portions of the arms.

Although I have illustrated and described preferred embodiments of my invention, I do not wish to be limited thereby because the scope of my invention is best set forth in the following claims.

I claim:

1. A fastener secured installation comprising a support having an aperture, a fastener member having an axial passage therethrough, said fastener member having a support-engaging means in engagement with the material of said support adjacent said aperture at one side, yieldable portions extending through said aperture, at least two of said yieldable portions having inwardly-disposed portions intersecting said axial passage, and an article of manufacture extending through said axial passage and engaging said inwardly-disposed portions to spread said yieldable portions whereby said yieldable portions are locked against contraction and in engagement with said support.

2. A fastener secured installation comprising a support having an aperture, a fastener member having an axial passage therethrough, said fastener member having a base in engagement with the material of said support adjacent said aperture, yieldable arms extending from beneath said base through said aperture and engaging said support to hold the fastener member in position, said arms having inwardly-disposed portions within said axial passage, and a unit having an outer covering of cardboard or the like material, said unit extending through the axial passage of said attaching member and engaging said inwardly-disposed portions to spread said yieldable arms whereby said arms are locked in engagement with said support and the ends of said inwardly-disposed portions are engaged with the outer covering of said unit and securely hold said unit between them.

3. A fastener secured installation comprising a support having an aperture, a fastener member secured to said support, said fastener member having a tubular shank, said shank having a flanged base portion at one end, said base engaging the material of said support adjacent said aperture, contractible and expansible arms extending from beneath said base through said aperture, said arms resiliently engaging the walls surrounding said aperture, said arms having inwardly-projecting free end portions disposed beneath said shank and in line with the bore thereof, and an article of manufacture extending through the bore of said shank and engaging said inwardly-projecting portions thereby spreading said arms whereby said arms are locked in engagement with said support and said article is securely gripped by said inwardly-projecting portions.

4. A fastener secured installation comprising a support having an aperture, a one-piece fastener member having an axial passage therethrough, said fastener member having a base superposed above the material of said support adjacent said aperture, an annular series of bowed yieldable portions extending from beneath said base through said aperture, said yieldable portions having portions intermediate their ends engaging the material of said support adjacent said aperture for securing said fastener member thereto and an article of manufacture extending into the axial passage of said fastener member.

WILLIAM G. ROBY.